Patented Aug. 7, 1934

1,969,041

UNITED STATES PATENT OFFICE 1,969,041

BRAKE LINING COMPOSITION

Ralph L. Seabury and Louis W. Murray, Anderson, Ind., assignors, by mesne assignments, to General Motors Corporation, Detroit, Mich., a corporation of Delaware No Drawing. Application May 29, 1930, Serial No. 457,542

6 Claims. (Cl. 106—7.5)

This invention relates to a brake lining composition and the method of making such composition.

It is one object of the present invention to provide a brake lining which shall have superior wearing qualities and a relatively high coefficient of friction but will not score the brake drums. It is a further object of the invention to produce a brake lining material which has a uniform coefficient of friction under various conditions of pressure, temperature and speed, and one, which is unchanging and retains the same characteristics regardless of operating conditions.

It is a further object of the invention to devise a method for manufacturing brake lining having the properties above referred to which is effective to produce an article of superior quality, is easy to carry out, and is inexpensive.

It is a further object of the invention to devise a method of mixing materials from which the brake lining is made in such a way as to secure a uniform mixture of these materials so that the finished article will be of uniform quality.

According to one form of this invention, the brake lining is formed of a mixture of asbestos, a phenolic condensation product such as bakelite, and metallic lead in powdered form. A mixture which has been found to be satisfactory contains these ingredients in the following proportions: lead 33% or more of the entire mixture, asbestos and bakelite 67% or less of the entire mixture. It has been found that the percentage of bakelite and asbestos may be varied somewhat. For instance the proportions may be four parts asbestos to one part bakelite or five parts bakelite to one part asbestos with equally good results.

In carrying out the process of making a brake lining of the composition above set forth the bakelite and asbestos are mixed in wet condition, the bakelite being dissolved in an approximate 5% solution of some alkaline salt such as sodium hydroxide, calcium hydroxide, potassium hydroxide, sodium silicate, or sodium carbonate; in fact almost any alkali with the exception of ammonium hydroxide may be employed. The amount of the various salts necessary to dissolve the bakelite will vary somewhat depending on the particular alkali used, but if sodium hydroxide is used, about one gram is used in the solution to every five grams of bakelite. The bakelite will be entirely dissolved and the solution is then added to wet asbestos in any suitable container. The asbestos may be secured in shredded condition, or if not, must be shredded in some suitable device. The shredded asbestos is then wet with water in relatively large quantities, about twenty parts by weight of water to one part of asbestos, and the bakelite in solution added thereto and thoroughly mixed with the wet asbestos.

After mixing the bakelite solution with the asbestos, sufficient acid is added to neutralize the mixture, the acid being added slowly in any desirable manner while stirring the mixture, the bakelite being precipitated from the solution in the form of a light, fluffy curd which coats the asbestos, the alkali and acid reacting to form water and a salt in solution. The whole is then filtered and washed to take out the salt and the residue of asbestos coated with bakelite is dried. This may be done either by spreading out in a thin layer and drying in air at normal temperature or it may be dried in a suitable oven, so long as the temperature be maintained at less than 200° F.

The dried material obtained as above described is then ground or pulverized in any suitable mill or shredding machine to form a relatively fine powder which is then spread out in a thin layer and wet with alcohol or some other suitable volatile liquid, just enough to make the shredded mixture sticky so that lead particles will adhere thereto. The wet powder is then sprinkled with lead powder which is mixed therewith and the mixture is briquetted in a suitable press under a pressure of substantially 14,000 to 30,000 pounds per square inch. The briquetting operation should be carried out before the alcohol or other volatile liquid evaporates in order that it be done while the lead particles are still stuck to the asbestos-bakelite shredded mixture. Otherwise, the lead will not be uniformly distributed throughout the material.

The briquettes are cured in a bakelite press in the usual manner under pressure at substantially 6,000 pounds and with application of heat, but the temperature maintained must not be sufficient to coke the bakelite, and is generally about 300° F.

Another form of this invention contemplates the formation of a brake lining in which graphite is substituted and in which the proportions of the various materials are not the same as when lead is employed. It has been found that satisfactory results will be obtained with proportions varying from forty parts asbestos, forty-one parts graphite and nineteen parts bakelite to fifty-two parts asbestos, twenty-seven parts graphite and nineteen parts bakelite, by weight.

In the manufacture of the lining containing graphite instead of lead, the asbestos is wet as described above, and the graphite added thereto while the bakelite which is dissolved in an alkaline solution in the manner previously described, is then added to the mixture of wet asbestos and graphite. The bakelite solution might be first mixed with graphite and the mixture added to the wet asbestos but in order to secure a homogeneous mixture of the materials it would be necessary to first wet the graphite before the bakelite solution was added thereto. Much better results are obtained when the bakelite solution is added to wet graphite than when the graphite is dry. Graphite is porous and when wet the pores are full of water so that the bakelite is not absorbed in the pores, but coats the surface only. If dry graphite is mixed with the bakelite solution there is considerable absorption of the binder so that a greater quantity of the binder is necessary and the article produced is not of as good quality.

After mixing the asbestos, graphite, and binder in either way above referred to, acid is added to neutralize the alkali and the bakelite is precipitated as above described, after which the precipitate is filtered, washed, dried and pulverized in the manner previously set forth. The powder formed is then briquetted under a pressure of 14,000 to 30,000 pounds per square inch into the desired form and cured in a bakelite mold, as has been previously described in connection with the manufacture of the material containing lead.

The material formed in accordance with the process above described, whether employing lead or graphite makes an excellent brake lining, having a uniform coefficient of friction, excellent wearing qualities, good braking effect and does not operate to score the brake drums.

The advantages of the method of mixing the binder in the form of a solution as above described are most marked. If it be attempted to mix the binder with dry asbestos it is apparently impossible to secure a homogeneous mixture of the materials or a product which is nearly uniform in quality.

While the form of embodiment of the present invention as herein disclosed, constitutes a preferred form, it is to be understood that other forms might be adopted, all coming within the scope of the claims which follow.

What is claimed is as follows:

1. A brake lining material containing asbestos, a phenolic condensation product and at least 33⅓% of lead.

2. A brake lining material comprising one-third or more of lead and two-thirds or less of asbestos and a phenolic condensation product.

3. A brake lining material approximately 33 percent lead, fifty-three percent asbestos and fourteen percent phenolic condensation product.

4. The method of making brake lining material which includes the steps of wetting shredded asbestos with water, forming a solution of a phenolic condensation product in a caustic alkali and mixing such solution with wet asbestos, adding sufficient acid to neutralize the alkali and precipitate the condensation product, filtering, washing, drying and pulverizing the precipitate comprising a mixture of asbestos and the condensation product, wetting the precipitate sufficiently with alcohol to cause lead powder to adhere thereto, and adding the desired quantity of lead powder thereto.

5. The method of making brake lining material containing asbestos, lead and a phenolic condensation product which includes the steps of forming a pulverized mixture of asbestos and the condensation product, wetting the mixture with sufficient alcohol to cause lead particles to adhere thereto and mixing powdered lead therewith.

6. The method of making brake lining material which includes the steps of wetting asbestos with water, forming a solution of a phenolic condensation product in a caustic alkali and mixing such solution with the wet asbestos, adding sufficient acid to precipitate said condensation product, and separating out the precipitate comprising a mixture of asbestos and phenolic condensation product.

RALPH L. SEABURY.
LOUIS W. MURRAY.